(12) United States Patent
Beaurepaire et al.

(10) Patent No.: US 11,639,185 B2
(45) Date of Patent: May 2, 2023

(54) METHOD TO PREDICT, REACT TO, AND AVOID LOSS OF TRACTION EVENTS

(71) Applicant: HERE Global B.V., Eindhoven (NL)

(72) Inventors: Jerome Beaurepaire, Berlin (DE); Leon Stenneth, Chicago, IL (US); Jeremy Michael Young, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 113 days.

(21) Appl. No.: 17/072,843

(22) Filed: Oct. 16, 2020

(65) Prior Publication Data

US 2022/0119010 A1   Apr. 21, 2022

(51) Int. Cl.
| | | |
|---|---|---|
| *G06N 5/02* | (2006.01) | |
| *B60W 30/02* | (2012.01) | |
| *B60W 40/06* | (2012.01) | |
| *B60W 60/00* | (2020.01) | |
| *B60W 30/18* | (2012.01) | |

(Continued)

(52) U.S. Cl.
CPC ........ *B60W 60/0015* (2020.02); *B60W 30/02* (2013.01); *B60W 30/18163* (2013.01); *B60W 30/18172* (2013.01); *B60W 40/06* (2013.01); *B60W 40/13* (2013.01); *G06N 5/02* (2013.01); *G08G 1/22* (2013.01); *B60W 2530/10* (2013.01); *B60W 2530/20* (2013.01); *B60W 2555/20* (2020.02); *B60W 2556/10* (2020.02); *B60W 2556/65* (2020.02)

(58) Field of Classification Search
CPC ............. B60W 60/0015; B60W 30/02; B60W 30/18163; B60W 30/18172; B60W 40/06; B60W 40/13; B60W 2530/10; B60W 2530/20; B60W 2555/20; B60W 2556/10; B60W 2556/65; G06N 5/02; G08G 1/22
See application file for complete search history.

(56) References Cited

U.S. PATENT DOCUMENTS

| | | |
|---|---|---|
| 7,487,669 B2 | 2/2009 | Bertrand |
| 9,493,145 B2 | 11/2016 | Mehr |

(Continued)

FOREIGN PATENT DOCUMENTS

| | | | |
|---|---|---|---|
| DE | 102019112662 A1 | * | 11/2020 |
| KR | 20170052856 A | | 5/2017 |
| WO | 2017198972 A1 | | 11/2017 |

OTHER PUBLICATIONS

Simon Flumm, May 15, 2019, English Machine Translation_ DE102019/112662A1 provided by Patent Translate by EPO and Google (Year: 2019).*

(Continued)

*Primary Examiner* — Peter D Nolan
*Assistant Examiner* — Ashley L Redhead, Jr.
(74) *Attorney, Agent, or Firm* — Lempia Summerfield Katz LLC

(57) ABSTRACT

System and methods are provided for predicting, reacting to, and avoiding loss of traction events, such as hydroplaning for autonomous vehicles. For example, the method predicts a risk of an area being subject to hydroplaning using real-time data and/or historical data. The method may store possible hydroplaning events in a geographic map along with a risk assessment. The method provides lane level hydroplaning risk predictions and avoidance mechanisms.

19 Claims, 12 Drawing Sheets

(51) Int. Cl.
*B60W 40/13* (2012.01)
*G08G 1/00* (2006.01)

(56) References Cited

U.S. PATENT DOCUMENTS

| | | |
|---|---|---|
| 9,571,449 B2 | 2/2017 | Obradovich |
| 9,849,724 B2 | 12/2017 | Blandina |
| 2008/0125972 A1* | 5/2008 | Neff .................. B60W 40/02 701/300 |
| 2016/0358477 A1* | 12/2016 | Ansari ................ B60W 30/12 |
| 2017/0158191 A1* | 6/2017 | Bills .................... B60W 10/06 |
| 2018/0060674 A1* | 3/2018 | Zhao .................... G06V 20/56 |
| 2019/0271550 A1 | 9/2019 | Breed |
| 2019/0354101 A1* | 11/2019 | Sujan ................ B60W 60/005 |
| 2020/0353949 A1* | 11/2020 | Huang ............... G01C 21/3691 |
| 2021/0209949 A1* | 7/2021 | Hisanaga ............ G08G 1/0133 |
| 2021/0261123 A1* | 8/2021 | Wray ................ B60W 30/0956 |
| 2021/0294944 A1* | 9/2021 | Nassar ................ G06F 11/3664 |
| 2021/0372919 A1* | 12/2021 | Nakanishi ............ G06V 20/588 |
| 2021/0387639 A1* | 12/2021 | Chintala ................ G08G 1/095 |
| 2022/0028277 A1* | 1/2022 | Patnaik ............ G08G 1/096775 |
| 2022/0076571 A1* | 3/2022 | Choi .................... G08G 1/0145 |

OTHER PUBLICATIONS

Gunaratne, M., et al. "Hydroplaning on Multi Lane Facilities" Report No. BDK84 977-14. Florida Department of Transportation, Nov. 2012. (pp. 1-130).

Hartmann, Bernd, et al. "Hydroplaning Avoidance—A Holistic System Approach." Continental AG. Germany. Paper No. 19-0256. (pp. 1-25).

\* cited by examiner

ముందుmethod to predict, react to, and avoid loss of traction events

METHOD TO PREDICT, REACT TO, AND AVOID LOSS OF TRACTION EVENTS

FIELD

The following disclosure relates to navigation devices or services.

BACKGROUND

Loss of traction events can occur at almost anytime and anywhere, for example, when dry or normal conditions change to rain, ice, or other issues. These events can have devastating consequence to vehicles and passengers. One example of a loss of traction is hydroplaning. Hydroplaning refers to the loss of traction that occurs when vehicle tires encounter more water than they can disperse or scatter. The tire essentially "floats" on the resulting layer of water. Because the tire loses contact with the pavement, traction is eliminated or greatly reduced until the tire re-establishes effective contact. The loss of traction causes a loss of braking, steering and power control. A hydroplaning tire cannot respond to the driver's braking or steering efforts until the layer of water is dissipated and the tire re-establishes sufficient contact with the pavement. Hydroplaning risks may be greatest when certain conditions exist such as during and after heavy rain, during and after a rain that follows warm, dry weather as such weather allows oily residue to form on the pavement; even a light rain mixed with that residue creates very slippery conditions, when roads are slushy, on roads that have rutted or grooved surfaces, or on roads that have no slope or camber (or lean).

For autonomous or semi-autonomous vehicles, loss of traction events may be difficult to handle. When driving in conditions that indicate a possibility of a hydroplaning event, a typical action is to hand over control of the vehicle to a human driver. The handing over protocol may be dangerous, since the vehicle may be in the middle of or be nearing a loss of traction event and may be veering out-of-control. An operator might not have sufficient time to overcome the situation, or might not have any options left as to how to get out of the predicament. Surprise handoffs are also jarring. As such autonomous and semi-autonomous vehicles (and vehicles in general) may attempt to avoid these types of hazardous conditions.

Predicting or anticipating loss of traction events may be difficult until the event actually occurs. As an example, for detecting hydroplaning situations, certain systems use tire-mounted sensors, surround-view cameras, and algorithms, to identify hydroplaning events. Video images from surround-view cameras mounted in the side mirrors, in the grill and on the rear of a vehicle are analyzed. This type of advanced system however is reactive and not predictive. In certain systems, the occurrence of a hydroplaning or loss of traction event may be passed to other vehicles. In addition, vehicles are constantly collecting a large amount of weather-related data and producing real-time weather-related observation system (i.e. activation of wiper, lights, and user or automated actuators as well as the information from temperature, hygrometry, and pressure sensors).

These solutions, however, are reactive instead of proactive. In addition, some hazards are unavoidable and finding another route is not possible. Some hazards affect certain vehicles differently so that a loss of traction event for one vehicle may not lead to a similar event for another vehicle or vice versa. Similarly, some hazards are unexpected and cannot be predicted using existing data and algorithms. One problem with navigation services is how to best predict and anticipate situations related to loss of traction events such as hydroplaning in the context of autonomous vehicles. Another problem is determining what to do about an upcoming loss of traction event and how to navigate a vehicle so that risk to the vehicle and any passengers is diminished.

SUMMARY

In an embodiment, a method is provided for lane level risk assessments, the method including: receiving, by a processor, real-time roadway data from a first vehicle for a portion of a lane of a roadway; generating, by the processor, based on the real-time roadway data and historical geographical data stored in a geographic database, a risk assessment for the portion of the lane of the roadway; receiving, by the processor, a request for routing instructions, from a second vehicle; applying the risk assessment to the second vehicle for the portion of the lane of the roadway; generating, by the processor, lane level routing instructions for the second vehicle based on the applied risk for the second vehicle; and transmitting, by the processor, the lane level routing instructions to the second vehicle.

In an embodiment, an apparatus is provided including at least one processor; and at least one memory including computer program code for one or more programs; the at least one memory configured to store the computer program code configured to, with the at least one processor, cause the at least one processor to: receive a request for routing instructions for a vehicle; calculate a risk assessment for a portion of an existing lane of a roadway based on real-time roadway data and historical geographical data stored in a geographic database; determine, the risk assessment exceeds an operating threshold for the vehicle; generate a virtual lane that avoids the portion of the existing lane, the virtual lane comprising only a part of the existing lane; and provide the virtual lane to the vehicle.

In an embodiment, a system for avoiding loss of traction events is provided. The system includes a memory configured to store lane data for a roadway network; a processor integrated into a vehicle, the processor configured to identify an upcoming location on a portion of a lane that will result in a loss of traction event for the vehicle, the processor further configured to generate or receive a virtual lane that is different than stored lane data in the geographic database, the virtual lane avoiding the upcoming location; and a transceiver configured to transmit or receive the virtual lane to or from devices in a vicinity of the vehicle that are traversing the roadway network.

BRIEF DESCRIPTION OF THE DRAWINGS

Exemplary embodiments of the present invention are described herein with reference to the following drawings.

DETAILED DESCRIPTION

Figure 1:
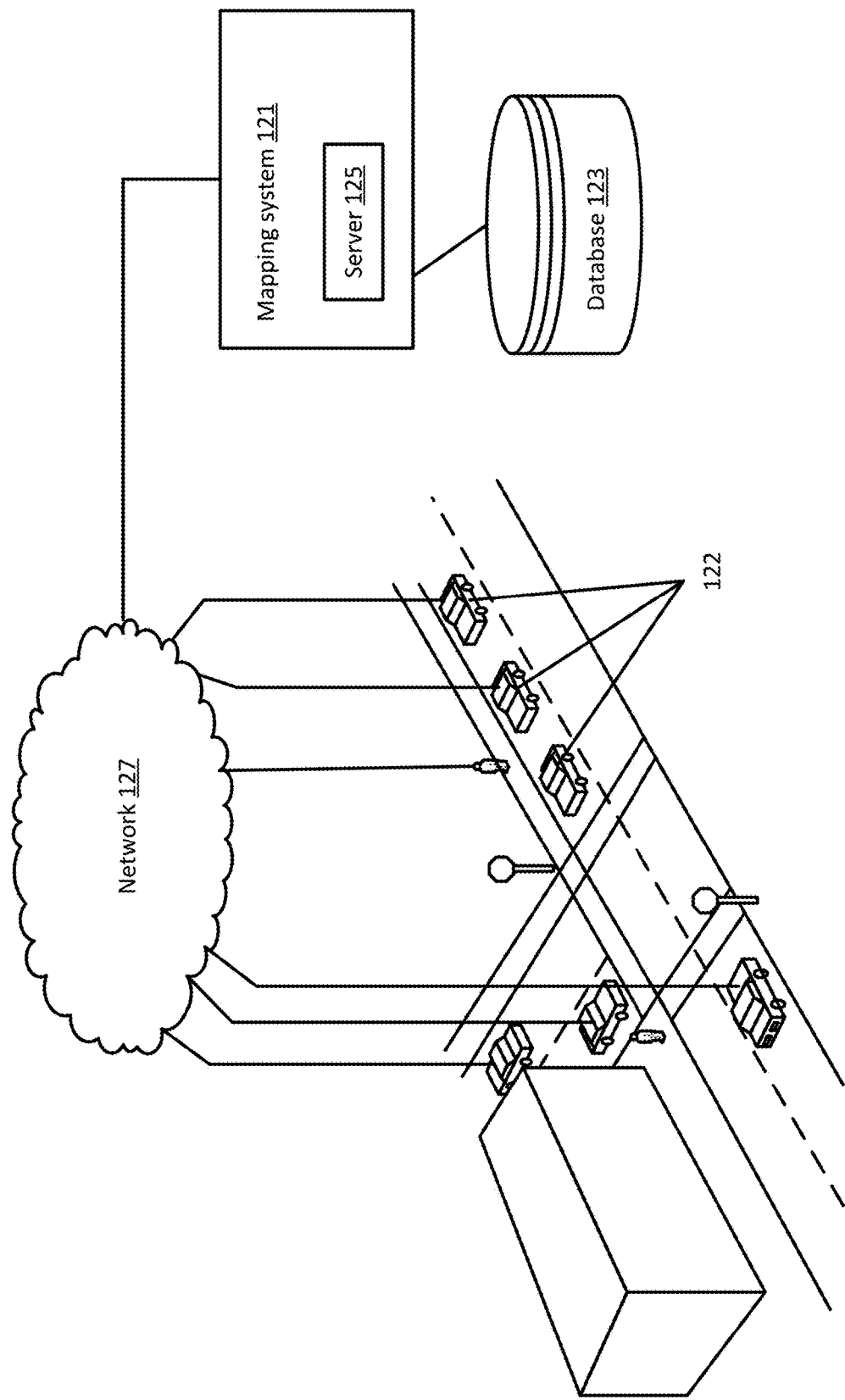
FIG. 1 depicts an example of a system for predicting, reacting to, and avoiding loss of traction events according to an embodiment.

Embodiments described herein provide systems and methods for predicting, reacting to, and avoiding high risk areas. Embodiments provide a predictive system that determines with a given confidence level the risk of an area being subject to a loss of traction event. The possibility of a risk of a loss of traction event is modelled, mapped, and stored with a likelihood and related confidence level (at current time and at the time, a vehicle will reach the area). Using a detailed high definition (HD) map and precise localization, lane level predictions are provided that allow for linking risky areas or lanes to disengagement areas for autonomous vehicles when applicable, taking preemptive measures based on the knowledge of the models to avoid reaching the state of loss of traction event risk, and adjusting and coordinating lane level changes. The embodiments provide for passengers of autonomous vehicles to benefit from safer and more convenient rides by being able to predict, for example, a risk of hydroplaning based on historical data and real time/prediction weather and react accordingly.

The systems and methods described herein are applicable to mapping systems in general, but more specifically mapping systems that support fully highly assisted, autonomous, or semi-autonomous vehicles. A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the position of the vehicle and routing instructions. Advanced driver-assistance system (ADAS) vehicles include one or more partially automated systems in which the vehicle alerts the driver. The features may be used to provide alerts to the operator regarding upcoming features. ADAS vehicles may include adaptive cruise control, automated braking, or steering adjustments to keep the driver in the correct lane. ADAS vehicles may issue warnings for the driver based on the position of the vehicle either on a roadway or within a road network system.

During the operation of a vehicle on a roadway, the roadway may become very slippery when wet, frozen, or covered with a slick material such as oil. As a result, the tires of the vehicle might not grip the road well. A vehicle control system, for example as used in a HAD or ADAS vehicle, needs to be able to identify that the roads are wet, and determine how to best maneuver the vehicle around or through the hazardous conditions. If the vehicle control system tries to accelerate or turn in the same manner as on a dry surface, the wheels may spin or the vehicle may skid out of control. These loss of traction events may be very dangerous.

One example of a hazardous road condition that can cause a loss of traction event is standing water that may cause, for example hydroplaning. The following description uses hydroplaning as an example of a loss of traction event although the systems and methods may be applicable to all types of loss of traction events, for example including but not limited to icy, snow, or slush conditions, oil or foreign substances, or otherwise slippery road conditions that cause the vehicle to operate differently than if the vehicle was operated on a dry normal roadway. As an example of a loss of traction event, hydroplaning occurs when a rotating tire floats up and skates on the surface of the water. Hydroplaning is a function of several variables such as, but not limited to, vehicle speed, the tire's tread depth (and design) and the depth of the water. Current systems are generally reactive in that they are configured to maneuver a vehicle once the vehicle has started hydroplaning. These systems use tire-mounted sensors, surround-view cameras, algorithms, and brake actuation among other functions to prevent front-wheel floating. These systems use the sensors to detect a possible hydroplane situation as early as possible to provide control and stabilization of the hydroplaning vehicle by, for example, creating a torque-vectoring effect through individual rear-wheel braking.

While reacting to a loss of traction event such as hydroplaning is important, avoidance may be a better solution. Embodiments provide a system and method that with localization technologies and hyper-accurate localization capabilities, maps hydroplane areas with higher precision based on even which wheels the hydroplane area would impact the hazardous condition within a particular lane. From this type of data, lane specific routing may also be provided. In addition, a refined drive path may be computed around the hydroplane area without fully changing lanes if traffic allows. For example, a lower-class road with no lane lines might lead to the system identifying a new drive path on the same road. In another example, for a two-lane road, the system may elect to break navigation rules and move the vehicle into the oncoming lane to swerve around the hazardous condition if the system identifies the adjacent oncoming lane as clear. For certain persistent hazards, a virtual lane may be generated for a period of time.

To further improve the risk assessment, a feedback loop may be included where onboard sensors (cameras, lidar, etc. . . . ) when passing such an area are configured to confirm the presence of water or other material in the road in the predicted area assumed to be a hydroplaning hazard even if the vehicle collecting data does not experience a loss of traction event. The confirmation may then update in real-time the prediction area as well as improve the predictive algorithms. The improved predictions and risk assessments may be used for lane level optimizations including, for example, dynamically closing a lane or a portion of a lane for a given length and duration if that can help limiting the intensity or duration of hydroplaning or creating one virtual lane out of two lanes by instructing vehicles to "drive in the middle of the two lanes" in case that would help in some areas. When some slaloming around some identified or predicted hydroplaning areas on various lanes is required, the system may make it possible in a safe way by informing all vehicles to perform such action (using vehicle to vehicle communication) as well as the passengers of the vehicles through some a user interface or voice output so that the passengers realize what is happening and why this is safe.

The following embodiments relate to several technological fields including but not limited to navigation, autonomous driving, assisted driving, traffic applications, and other location-based systems. The following embodiments achieve advantages in each of these technologies because an increase in the accuracy of the identification of dangerous conditions improves the effectiveness, efficiency, and speed of specific application in these technologies. In each of the technologies of navigation, autonomous driving, assisted driving, traffic applications, and other location-based systems, improved identification of dangerous conditions at a lane level improves the technical performance of the application. In addition, users of navigation, autonomous driving, assisted driving, traffic applications, and other location-based systems are more willing to adopt these systems given the technological advances in lane level detection of dangerous conditions.

FIG. 1 illustrates an example system for predicting, reacting to, and avoiding loss of traction events. The system includes one or more devices 122, a network 127, and a mapping system 121. The mapping system 121 may include a database 123 (also referred to as a geographic database 123 or map database) and a server 125. Additional, different, or fewer components may be included.

The one or more devices 122 may include probe devices, probe sensors, IoT (internet of things) devices, or other devices 122 such as personal navigation devices 122 or connected vehicles. The devices 122 may be a mobile device or a tracking device that provides samples of data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices may be configured as data sources that are configured to acquire roadway data. These devices 122 may be remotely monitored and controlled. The devices 122 may be part of an environment in which each device 122 communicates with other related devices in the environment to automate tasks. The devices may communicate sensor data to users, businesses, and, for example, the mapping system 121.

The devices 122 may also be integrated in or with a vehicle. The devices 122 may be implemented in a vehicle control system such as used in a HAD or ADAS vehicle. The devices 122 acquire data from multiple sources including but limited to the mapping system 121, other devices 122, other vehicles, and sensors included with or embedded in the vehicle that the device 122 is implemented with. A device 122 may provide assistance or provide commands for a vehicle control system to implement. The term autonomous vehicle may refer to a self-driving or driverless mode in which no passengers are required to be on board to operate the vehicle. There are five typical levels of autonomous driving. For level 1, individual vehicle controls are automated, such as electronic stability control or automatic braking. For level 2 at least two controls can be automated in unison, such as adaptive cruise control in combination with lane-keeping. For level 3, the driver can fully cede control of all safety-critical functions in certain conditions. The car senses when conditions require the driver to retake control and provides a "sufficiently comfortable transition time" for the driver to do so. For level 4, the vehicle performs all safety-critical functions for the entire trip, with the driver not expected to control the vehicle at any time. For level 5, the vehicle includes humans only as passengers, no human interaction is needed or possible. Vehicles classified under Levels 4 and 5 are considered highly and fully autonomous respectively as they can engage in all the driving tasks without human intervention. An autonomous vehicle may also be referred to as a robot vehicle or an automated vehicle. The autonomous vehicle may include passengers, but no driver is necessary. The autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or comply with a routing or driving instruction from the device 122 or a remote mapping system 121.

The device 122 may be configured as a navigation system for an autonomous vehicle or a HAD. Any of these assisted driving systems may be incorporated into the device 122. Alternatively, an assisted driving device may be included in the vehicle. The assisted driving device may include memory, a processor, and systems to communicate with a device 122. The assisted driving vehicles may response to geographic data received from geographic database 123 and the server 125. An autonomous vehicle or HAD may take route instructions based on a road segment and node information provided to the navigation device 122. An autonomous vehicle or HAD may be configured to receive routing instructions from a mapping system 121 and automatically perform an action in furtherance of the instructions. The autonomous vehicle's ability to understand its precise positioning, plan beyond sensor visibility, possess contextual awareness of the environment and local knowledge of the road rules are critical.

Autonomous vehicle and other assisted vehicles rely on sensors to keep the vehicle in the correct lane, perform maneuvers, and/or avoid obstacles. The device 122 may be configured to provide lane level positioning of the vehicle. Lane level positioning may be provided using one or more sensor systems embedded in the vehicle or related thereto. Lane level positioning, for example, may be provided using a series of GPS points acquired by the device 122. In an embodiment, the location of the vehicle is map matched to a lane using the sensor data. The vehicle's location within the lane may also be determined. A GPS value may be used to identify the road segment using a map matching algorithm to match the GPS coordinates to a stored map and road segment. Lane level map matching may provide a good estimate of what lane a vehicle is on given a sequence of GPS probes coming from the vehicle. Other sensor data may be used to identify the lane, position in the lane, and road segment that the vehicle is operating on. The device 122 may use data from lateral acceleration sensors. Lane changes and positioning may be detected by determining a threshold of acceleration x time, above which a lane change would have occurred. The device 122 may only detect that the change was of sufficient magnitude and direction to have a displacement greater than the lane width. The device 122 may use inertial measurement units (IMU), gyro compasses, gyro-like compasses, or magnetometers of sufficient sensitivity to indicate if the vehicle is or is not turning onto another road. For example, a value would be less than a 45-degree total change without a road curvature. The device 122 may use a lateral acceleration method indicating initiation of a lane change, followed by lateral deceleration without a large change in direction to indicate completion of the lateral displacement. A determination of intent or completion of a lane change may be determined by the device 122 using individual techniques or a combination of multiple techniques. The device 122 may acquire data from multiple sensors from which intent or completion of lane maneuvers may be derived. For lane level map matching, using historical raw GPS probe positions, a layer of abstraction may be created over a map which is used to generate lane probabilities of real-time probes based on their lateral position. The probabilities form emissions probabilities of a hidden Markov model in which a Viterbi algorithm is used to make an inference of the actual most probable lane a probe trajectory traversed.

Precise lane level positioning may be provided using LiDAR, RADAR, video, images, or other sensors on a vehicle. For example, the device 122 may determine a current position or location in a lane based on image recognition techniques and a stored HD map. The device 122 may use LiDAR and RADAR to recognize information from the environment, such as curbs, road shapes, rails, vehicles, and road infrastructures. As an example, LiDAR components emit and receive laser signals to directly measure the distance and intensity from the sensor to the objects. The LiDAR sensor may be configured to provide a 3D representation of the surrounding environment up to a distance of several hundred meters via installation of the sensor on top of the vehicle. For positioning data, the device 122 may identify lane markings from a difference in the intensity between the asphalt and the ink painting from the ground data.

The device 122 may also use passive sensors, such as vision-based techniques with cameras or other imaging sensors. The device 122 may use a vision-based technique to calculate an odometry from feature points of an acquired image, and positioning in real-time. The device 122 identifies lane markings and GPS and inertial measurement units (IMU) provide the positioning. The device 122 may also use a map-matching method provided by a precise high-definition (HD) map. An HD map, stored in or with the geographic database 123 or in the devices 122 is used to allow a device 122 to identify precisely where it is with respect to the road (or the world) far beyond what the Global Positioning System (GPS) can do, and without inherent GPS errors. The HD map allows the device 122 to plan precisely where the device 122 may go, and to accurately execute the plan because the device 122 is following the map. The HD map provides positioning and data with decimeter or even centimeter precision.

The HD map and the geographic database 123 are maintained and updated by the mapping system 121. The mapping system 121 may include multiple servers, workstations, databases, and other machines connected together and maintained by a map developer. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive.

The server 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data. The server 125 is configured to communicate with the devices 122 through the network 127. The server 125 is configured to receive a request from a device 122 for a route or maneuver instructions and generate one or more potential routes or instructions using data stored in the geographic database 123.

The server 125 may also be configured to generate routes or paths between two points (nodes) on a stored map. The server 125 is configured to predict the risk of hydroplaning at specific location(s) and design/generate routes or paths in light the risk. The server 125 may be configured to make lane level predictions for autonomous vehicles so that such vehicles may be able to take the safest path based on the characteristics of the vehicles and tires. The server 125 may be configured to generate virtual lanes and transmit or facilitate the transmission of the virtual lanes to other devices 122. The server 125 is configured to compute a model that captures how quickly water or other liquids or materials builds up on a given road link, a given lane for that link, or a given portion of the lane under given weather conditions and the conditions prior to the precipitations (e.g. was the road warm, cold, etc.). The server 125 may be configured to calculate and identify a duration of the event for a given road segment, lane, or portion of a lane. The server 125 may be configured to provide up to date information and maps to external geographic databases or mapping applications. The server 125 may be configured to encode or decode map or geographic data.

Figure 2:
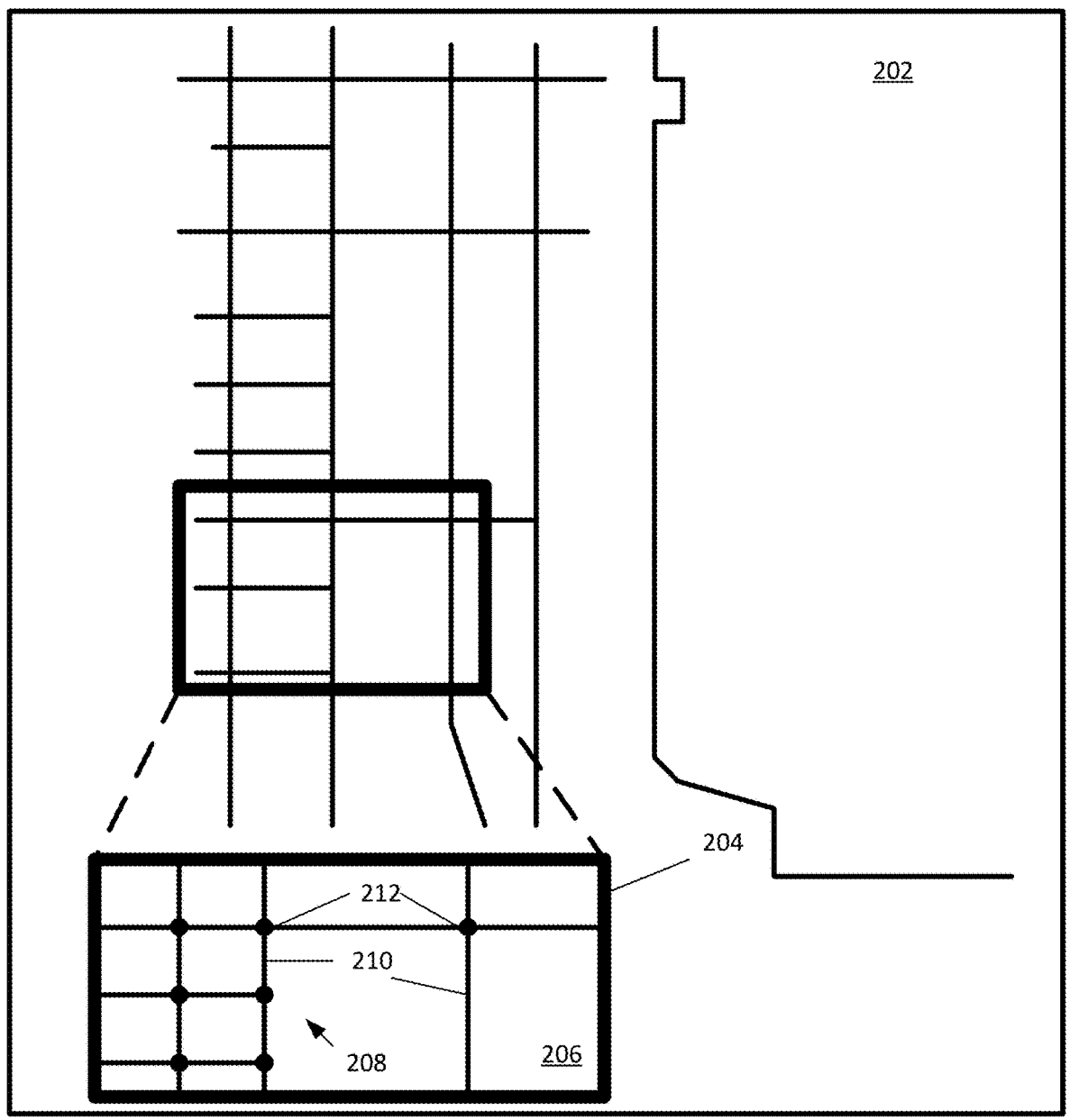
FIG. 2 depicts an example of a map of a geographic region.

In order to provide navigation-related features and functions to the end user, the mapping system 121 uses the geographic database 123. The geographic database 123 includes information about one or more geographic regions. FIG. 2 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 2 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 3:
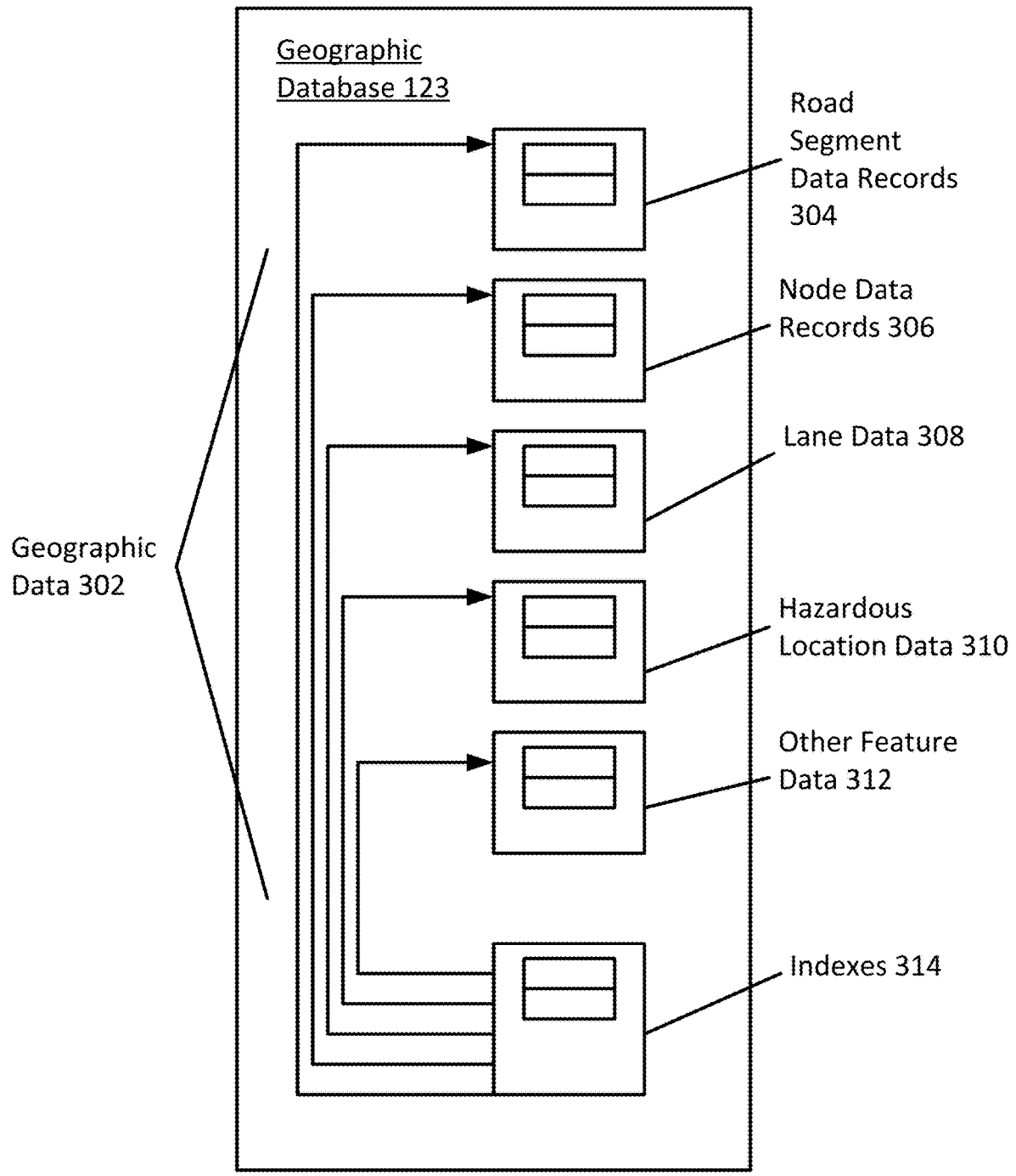
FIG. 3 depicts a block diagram of a geographic database of FIG. 1.

As depicted in FIG. 3, in one embodiment, the geographic database 123 contains geographic data 302 that represents some of the geographic features in the geographic region 202 depicted in FIG. 2. The data 302 contained in the geographic database 123 may include data that represent the road network 208. In FIG. 3, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges etc. The roadway data 308 may be further stored in sub-indices that account for different types of roads or features. The hazardous location data 310 may include data or sub-indices or layers for different types of hazards such as locations of water on a road segment or lane. The feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 4:
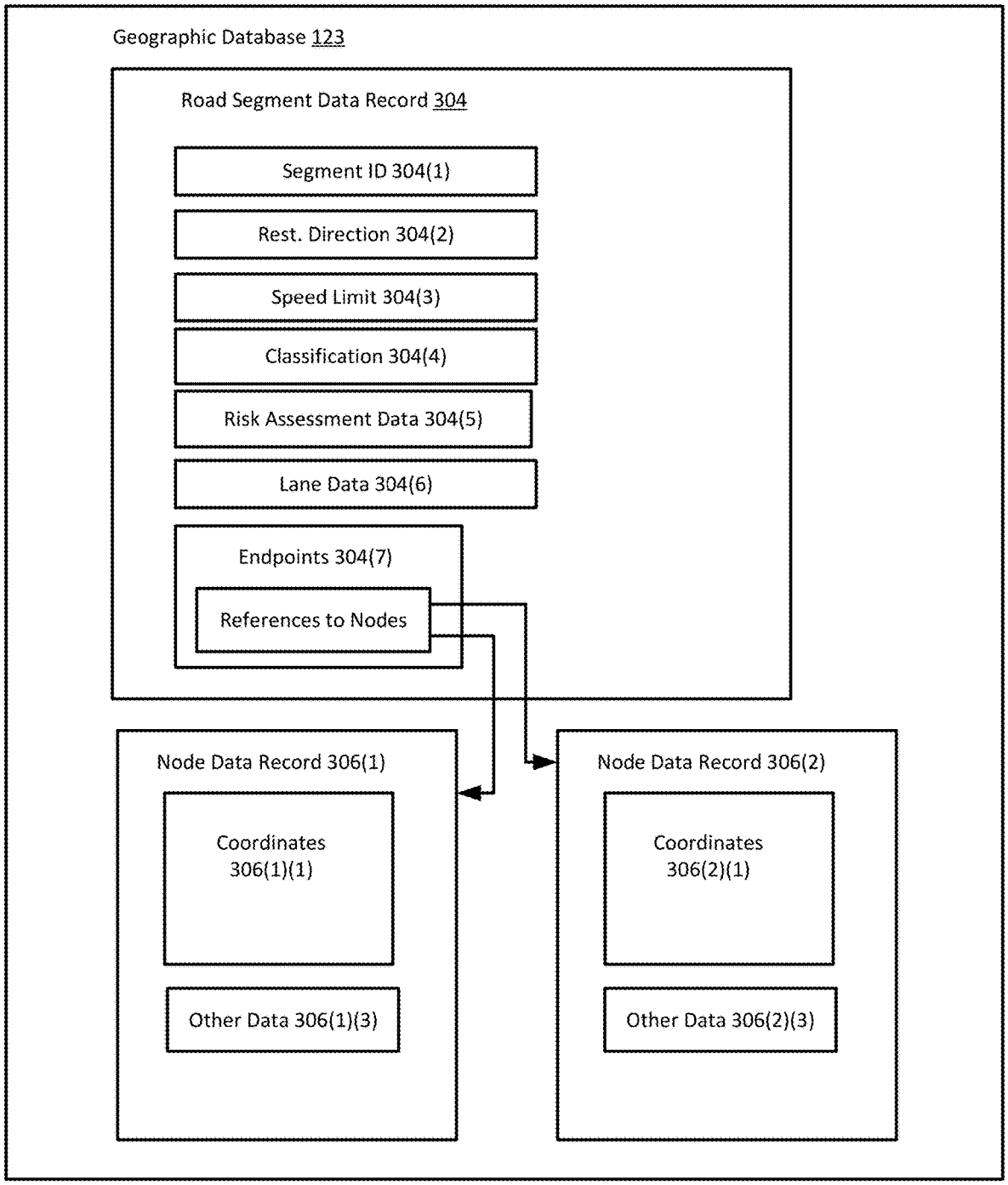
FIG. 4 depicts a diagram of a structure of a geographic database of FIG. 1.

FIG. 4 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with the data record, information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to risk assessments for the road segment, for example relating to possible hydroplaning events. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 4 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 4, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

Figure 5:
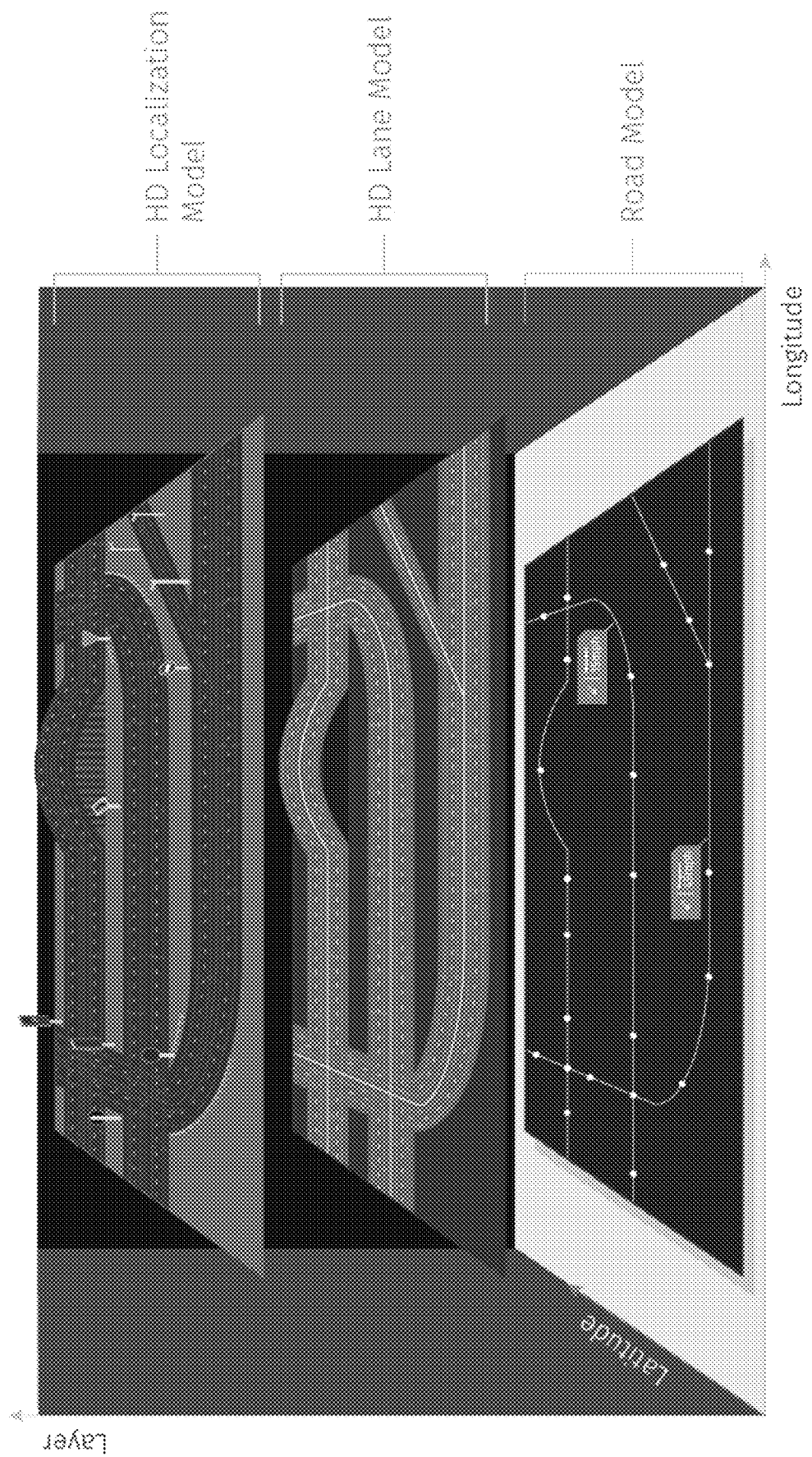
FIG. 5 depicts an example of high definition map layers.

FIG. 5 depicts an example of a layered HD map. The HD map data and/or layers may be stored in the database as feature data 312 or other data records. FIG. 5 includes three different layers, a HD localization model, an HD Lane Model, and a road model. The Road Model has robust map content at a global scale, providing vehicles with local knowledge that goes beyond the visibility of onboard sensors. The HD Lane Model provides more precise, lane level detail to assist self-driving vehicles in making safe decisions for a comfortable experience. It supports high definition lane topology and geometry, modeled with 3D positions. The HD Localization Model allows for utilization of multiple different localization approaches, to assist the vehicle in accurately locating itself within the lane it travels.

In an embodiment, the HD Localization Model includes a data layer for water level on the roadway. This layer may include or take into account data for the WFT, e.g. the depth of water above the roughness asperities of pavement. This data may include water level estimates based on weather or human related events (burst pipe, open hydrant, etc.). The data layer may also store data that relates to observations from vehicles or other sensors.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Remote sensing, such as aerial or satellite photography, may be used. The database 123 is connected to the server 125. The geographic database 123 and the data stored within the geographic database 123 may be licensed or delivered on-demand. Other navigational services or traffic server providers may access the traffic data stored in the geographic database 123. Data for an object or point of interest may be broadcast as a service.

To communicate with the systems or services, the server 125 is connected to the network 127. The server 125 may receive or transmit data through the network 127. The server 125 may also transmit paths, routes, or loss of traction risk data through the network 127. The server 125 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other devices 122 or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may uses a V2V communication system such as a Vehicular ad-hoc Network (VANET).

Figure 6:
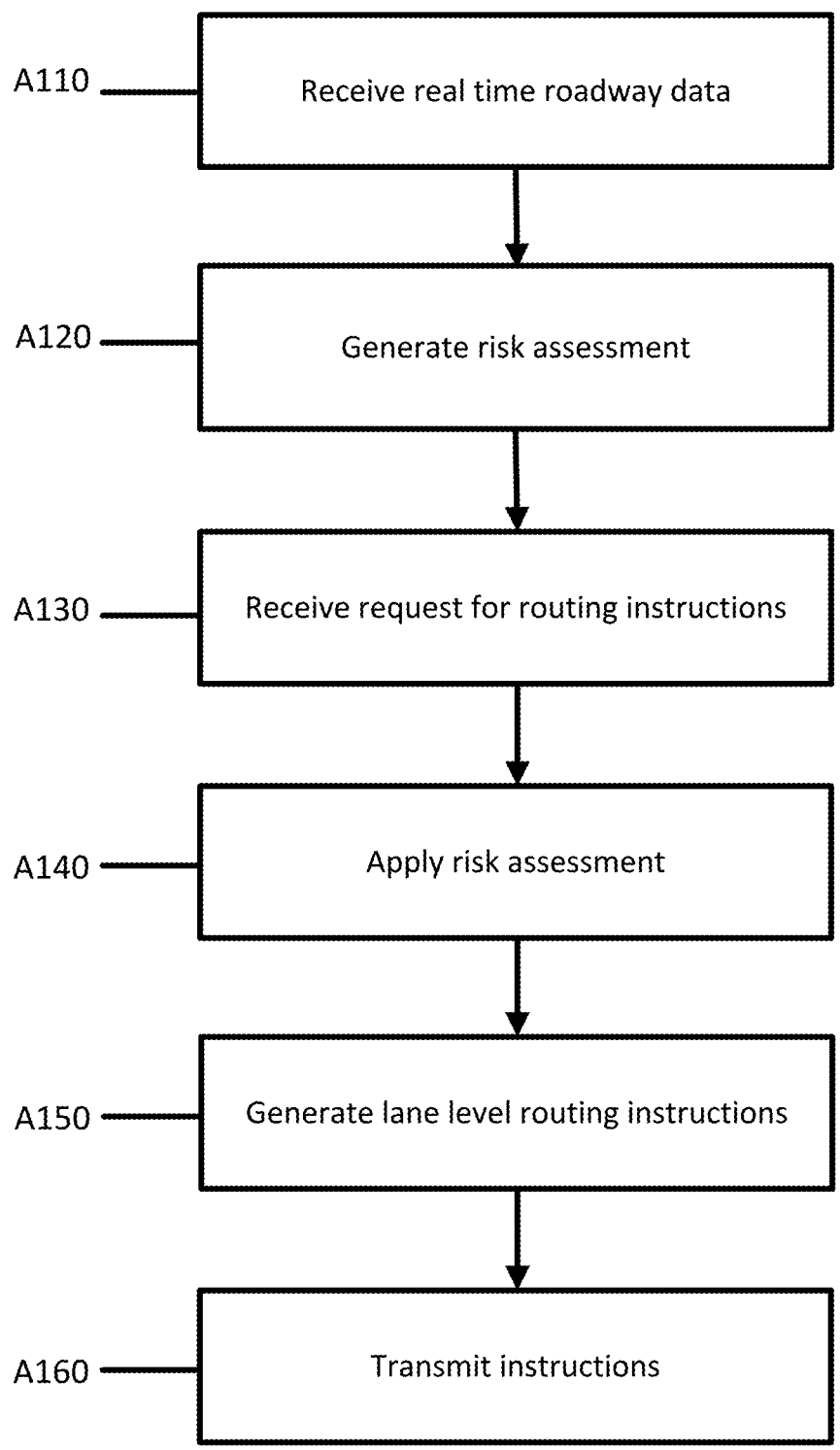
FIG. 6 depicts a flow chart for a method for identifying loss of traction event locations and generating routing instructions according to an embodiment.

In an embodiment, potential loss of traction areas are mapped with higher precision. Systems and methods provide lane level predictions for autonomous vehicles so that such vehicles may be able to take the safest path based on the characteristics of the vehicles and tires. Vehicles passing suspect areas identify or confirm the presence of a hazardous condition such as water in the roadway. The confirmation may then update, in real-time, the prediction area as well as improve the predictive algorithms allowing subsequent vehicles to avoid or react to the upcoming hazardous areas depending on the specific characteristics of the vehicles. FIG. 6 illustrates an example flow chart for identifying lane level risk assessments. As presented in the following sections, the acts may be performed using any combination of the components indicated in FIG. 1 or FIG. 12. The following acts may be performed by the server 125, the device 122, the mapping system 121, or a combination thereof. As an example, a copy of the geographic database 123 may be updated on both the device 122 and in the mapping system 121. An autonomous vehicle may take instruction from either the device 122 or the mapping system 121 based on data stored in the geographic database 123. In certain situations, the device 122 may be used as there is little to no delay for instructions to be generated and transmitted from the device 122 to the vehicle. The server 125 of the mapping system 121 may collect data from multiple devices 122 and provide this data to each of the devices 122 so that the devices are able to provide accurate instructions. Additional, different, or fewer acts may be provided. The acts are performed in the order shown or other orders. The acts may also be repeated. Certain acts may be skipped.

At act A110, the mapping system 121 receives real time roadway data from a first vehicle for a portion of a lane of a roadway. The roadway data is acquired from one or more sensors embedded in the first vehicle. Sensors may include sensors such as cameras, thermometer, cameras, radar sensors, sonar, LiDAR, and positional circuitry such as GPS or accelerometers. Each of the sensors may provide data to the device 122. The device 122 may analyze the data to generate information relating to the vehicle. The device 122 may also acquire data from, for example, the vehicle itself, such as direction, velocity, and acceleration. The sensor data may include data relating to conditions that may indicate a potential for a loss of traction event. In an embodiment, the vehicle does experience a loss of traction event but collects data using sensors about a portion of the roadway that may lead to a loss of traction event for another vehicle. As an example, the vehicle may be traversing a lane that is clear of hazardous material but the sensors are able to observe a hazardous condition, for example standing water, in an adjacent lane. In another example, the attributes of the vehicle, for example the speed, acceleration, weight, type of tires etc. may allow the vehicle to avoid a loss of traction event. However, a different vehicle with different attributes may suffer a loss of traction event at the same location as described below. The roadway data may relate to a lane or a portion of the lane. The portion of the lane may, for example, include less than 25%, 50%, or 75% of the lane.

Figure 7:
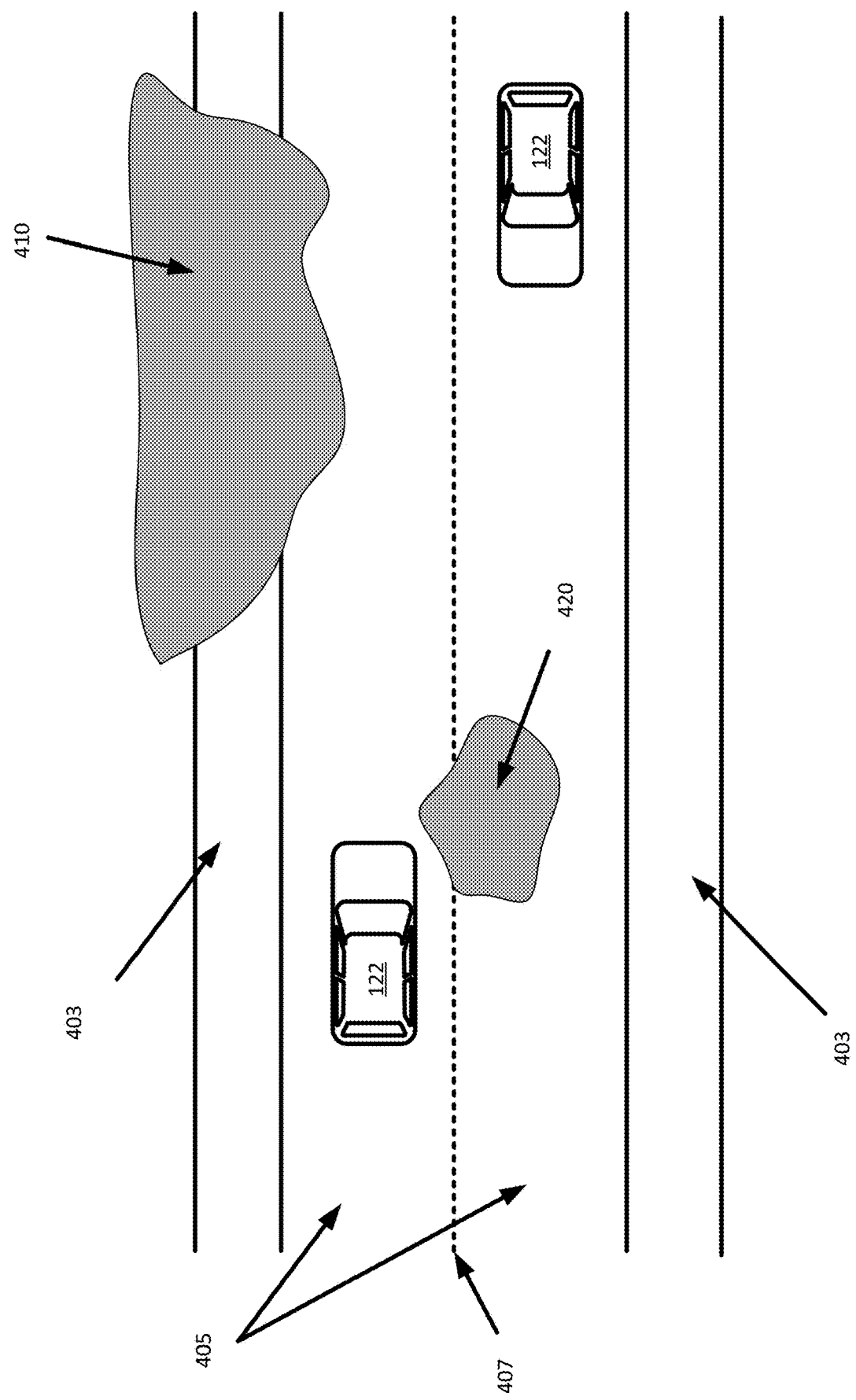
FIG. 7 depicts an example of possible loss of traction locations.

FIG. 7 depicts several example hazardous conditions 410, 420 that may lead or increase the risk of a loss of traction event, for example hydroplaning of a subsequent vehicle. FIG. 7 depicts a two-lane road with two lanes 405 and two shoulders 403. The two-lanes are separated by a centerline 407. There are two devices 122 embedded or otherwise integrated with two vehicles traveling the two lanes. FIG. 7 depicts two hazardous conditions 410, 420 which in this case may represent pools of water on top of the pavement. As each device 122 passes by the hazardous conditions 410, 420, the devices 122 capture data about the locations, for example, determining that there is pooled water and possibly the depth of the water at different locations. The devices 122 may capture real time data that allows the mapping system 121 to map each of the hazardous conditions 410, 420 down to the meter, decimeter, or centimeter. As each device 122 passes by the locations, additional data may be acquired. Further, if any device 122 or vehicle experiences a loss of traction event, the location and circumstances may be identified so that the system may learn to anticipate future events.

The real time roadway data is used to update the geographic database 123, for example, an HD map stored in the geographic database 123. The HD Map includes of multiple layers of data delivered in a map-tile format. These layers may be categorized into three main groups including a Road Model, a HD Lane Model, and a HD Localization Model as depicted in FIG. 5. There are also many sub-layers under these main categories. The Road Model sub-layers contain general road topology, road centerline geometry, and road-level attributes. The HD Lane Model sub-layers provide lane topology data and lane-level attributes. The HD Localization Model supports different localization approaches by providing various localization data.

The real-time roadway data may be stored in its own layer or, for example, with the HD localization model which includes object level data as well as generic localization data. The real-time roadway data may also be stored with the lane model. The Lane Model layer contains the geometry of lane boundaries and lane centerline paths. The geometry of the lane model layer may be used to assist in storing real time data relating to possible loss of traction events by providing a location framework for which to locate the data. For example, a puddle of standing water may be identified by the first vehicle and stored in the geographic database 123 using the lane geometry provided by the lane model layer.

In an embodiment, the geographic database 123 includes a data layer for water level on the roadway. This layer may include or take into account data for the water fluctuation table (WFT), e.g. the depth of water above the roughness asperities of pavement. This data may include water level estimates based on weather or human related events (burst pipe, open hydrant, etc.). The data layer may also store data that relates to observations from vehicles or other sensors.

At act A120, the mapping system 121 generates, based on the real time roadway data and historical geographical data stored in a geographic database 123, a risk assessment model for the portion of the lane of the roadway. The mapping system 121 may generate risk models for multiple different risks or hazardous conditions. One model, for example, may model or estimate the chance of a vehicle experiencing a hydroplaning event with a confidence level. Hydroplaning occurs when a tire encounters more water than it can scatter. Water pressure in the front of the wheel pushes water under the tire, and the tire is then separated from the road surface by a thin film of water and loses traction. The result is loss of steering, braking, and power control.

Different equations may be used to calculate whether or not a vehicle will experience a hydroplaning event. These equations are used to calculate a predicted hydroplaning speed (mph) when input such factors such as water fluctuation table (WFT) (in.), where WFT is considered to be the depth of water above roughness asperities of pavement, tread depth (in.), footprint aspect ratio, tire inflation pressure (psi), wheel load (kips), spin down ratio, among other inputs. If the vehicle is exceeding the calculated speed, then the vehicle may be at risk of hydroplaning. The chance and a confidence level may also be calculated. As an example, vehicles with underinflated tires are more likely to hydroplane as vehicles cannot hydroplane unless the water on the road is deeper than the tread on its tires. A vehicle with underinflated tires may require a lower speed to hydroplane than a vehicle with high inflated tires. The vehicle with underinflated tires may be given a higher chance with greater confidence by the system.

Figure 8:
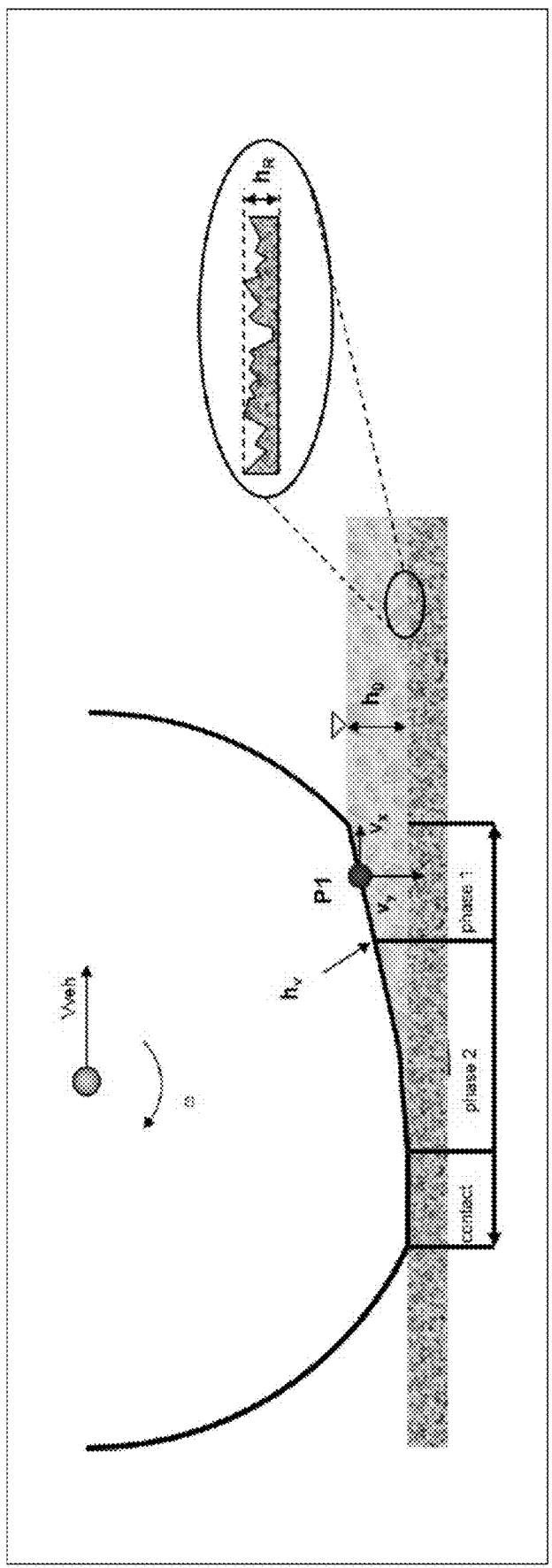
FIG. 8 depicts an example of hydroplaning.

FIG. 8 depicts an example of hydroplaning and the various inputs that may be used to calculate a hydroplaning event. At a vehicle speed of approximately 100 km/h a discrete element of the tire tread (P1) has a total contact duration with the surface and its top water layer of only 5 msec, where the three phases as displayed in FIG. 8 are passed through. In phase 1 the tread element is touching the water surface and displacing the water into the void volume of the tire's tread pattern. In phase 2, when the void is filled with water, the tire is analogously acting as a slick tire and more water cannot be absorbed by the void volume any more. This is the reason the excessive water must be displaced to the front and to the sides underneath the tire. As long as the tire's inside pressure is higher than the water pressure generated by the water wedge in front of the tire, the tire is successful in displacing the water to keep its road surface contact in the runout of the footprint. If the pressure relation changes and the pressure of the water wedge in front gets higher than the tire's inside pressure the tire will swim up. This water displacement phase before it comes to hydroplaning is used to be detected by reactive systems for an early hydroplaning warning.

A hydroplaning event can be predicted if these conditions are met. While certain attributes relating to the vehicle may be precisely known, perfect information about the extent of the hazardous condition may not be known. Ranges of values may be used, the output of which is a range of probabilities of an event occurring. The values for inputs may change over time as well, for example, due to evaporation or vehicles moving through the location. Updating information from each vehicle that observes the location may be used to update the risk model. The risk model may be updated as new data is acquired, for example by changing the equation based on identified hydroplaning events or altering the values of the variables when provided new data. Certain parameters may not be stored, for example specific parameters or attributes of individual vehicles such as weight, tire depth, etc., however, the mapping system 121 may attempt to store up to date, e.g. real-time, values for the properties of the pavement, water depth, temperature, etc.

The mapping system 121 may store values for each parameter of a hydroplaning risk model in the geographic database 123 for different portions of each lane of the roadway. The portions of the roadway may be based on, for example, the lane model stored in the geographic database 123. As an example, a portion may be identified by its location along the length of a link and its distance from, for example, the centerline, the median, or a curb as defined in the lane model. A potential hazardous location may be identified by a point with a size variable that indicates an area around the point that the hazard extends through. For certain locations, there may be multiple overlapping data points, for example, that describe precise depths of the water at different locations. These data points may be combined into a single hazardous location or if there is a distinct difference, may all be calculated and stored in the risk model.

As described above, real-time roadway data relating to the presence of a hazardous location may be stored in its own layer or, for example, with the lane model layer. The lane model layer contains the geometry of lane boundaries and lane centerline paths. The geometry of the lane model layer may be used to assist in storing real time data relating to possible loss of traction events by providing a location framework for which to locate the data. For example, a puddle of standing water may be identified by the first vehicle and stored in the geographic database 123 using the lane geometry provided by the lane model layer.

In an embodiment, the geographic database 123 includes a separate data layer for water level on the roadway. This layer may include or take into account data for the water fluctuation table (WFT), e.g. the depth of water above the roughness asperities of pavement. This data may include water level estimates based on weather or human related events (burst pipe, open hydrant, etc.). The data layer may also store data that relates to observations from vehicles or other sensors. This data may be made available to a device 122 embedded with the vehicle that can control a vehicle. As described below, the device 122 is able to generate a personal or private risk model as the navigation device 122 may store data relating to other variables such as the weight, tire type, capabilities, etc. of the vehicle. The device 122 is also configured to identify the speed of the vehicle.

At act A130, the mapping system 121 receives a request for routing instructions, from a second vehicle. The routing instructions may include lane level routing instructions. In an example, an autonomous vehicle may require lane level routing in order to traverse a roadway from a starting point to a destination. If, for example, the vehicle needs to make a turn, the vehicle must be in the correct lane to make that turn and as such requires lane level instructions. Further, to optimize the use of the roadway, lane level instructions may be required. The routing instructions may be altered or changed as the vehicle traverses the roadway. For example, lane level routing instructions may depend on the immediate surroundings of the vehicle as it traverses the roadway and as such may be provided in real-time or updated constantly.

At act A140, the mapping system 121 applies the risk model to the second vehicle for the portion of the lane of the roadway. The mapping system 121 may identify multiple different possible hazardous locations for the vehicle based on, for example, the data acquired from the first vehicle at act A110, other vehicles, sensors, and historical data. The risk model generated at A120 may be kept up to date by acquiring real time data from vehicles as they pass by or traverse each hazardous location. The mapping system 121 is configured to identify attributes of the second vehicle and apply those attributes to the risk model. These vehicle specific attributes may include the type of control system (e.g. fully autonomous, semi-autonomous, manual, etc.), the type and condition of the tires, the weight of the vehicle, past performance/experience, and any other attribute that may contribute to the risk model. In an embodiment, the values for these attributes are different between the first and second vehicle. Due to different values for the attributes (such as weight, tire type, speed, etc.) the first vehicle may not have experienced a loss of traction event while the second vehicle would if it continued though the hazardous location.

Figure 9:
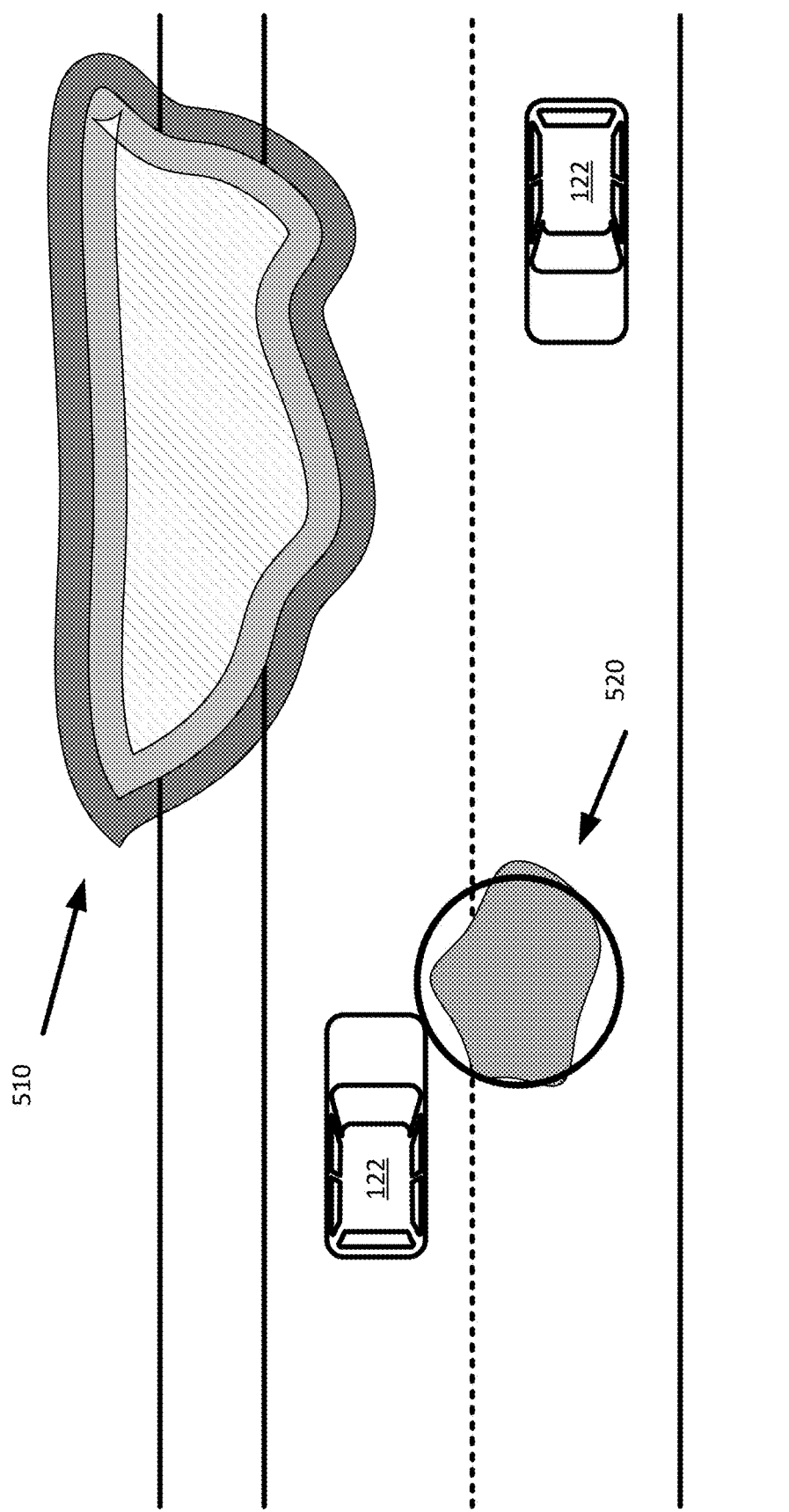
FIG. 9 depicts an example of risk assessments of the possible loss of traction locations of FIG. 7.

FIG. 9 depicts several risk assessments for the example hazardous conditions of FIG. 7. FIG. 9 depicts the same roadway location as FIG. 7 including the same lane configuration and two hazardous conditions. FIG. 9 depicts two different mechanisms to identify and store data relating to the locations. A first method 510 maps the hazardous location using precise measurements and may contain multiple different layers of risk. As depicted, the water level in this hazard is not equal but is shallower at the edges and thus provides a different level or risk than in the middle. A second method 520 provides a simple point and radius which attempts to encapsulate the hazard. The second method may be used when there is not detailed information about the hazard or if there is a need for less data to be transmitted or stored.

The risk assessments may be vehicle specific, for example based on the attributes of the vehicle as discussed above. The risk assessments may also be applied to certain classes or groups of vehicles with similar attributes. Each vehicle may calculate its own risk assessment based on information stored in the HD map or the geographic database 123.

At act A150, the mapping system 121 generates lane level routing instructions for the second vehicle based on the applied risk for the second vehicle. At act A160, the mapping system 121 transmits the lane level routing instructions to the second vehicle. The lane level routing instructions may include instructions to slow down, change lanes, exit a roadway, take an alternative route, etc. The lane level routing instructions may be unique to the vehicle based on the attributes of the vehicle and the status of the hazardous conditions.

In an embodiment, the lane level routing instructions may include an instruction to veer outside of the normal lanes to avoid a hazardous condition and therefore avoid the possibility of a loss of traction event, for example, a hydroplaning event. In certain scenarios for hydroplaning the risk of a traction event may be limited to a single location that may cover part of a lane or an entirety of a lane. The hazardous condition may prevent a vehicle from traversing that portion of the roadway safety while following roadway rules. In an embodiment, the mapping system 121 (or device 122) may generate a virtual lane outside the normal boundaries of the existing lanes in order to traverse a section of the roadway that would normally cause the vehicle to experience a loss of traction event such as a hydroplaning event. In another embodiment, the system may dynamically close a lane for a period of time or create a new lane out of two distinct lanes.

Figure 10:
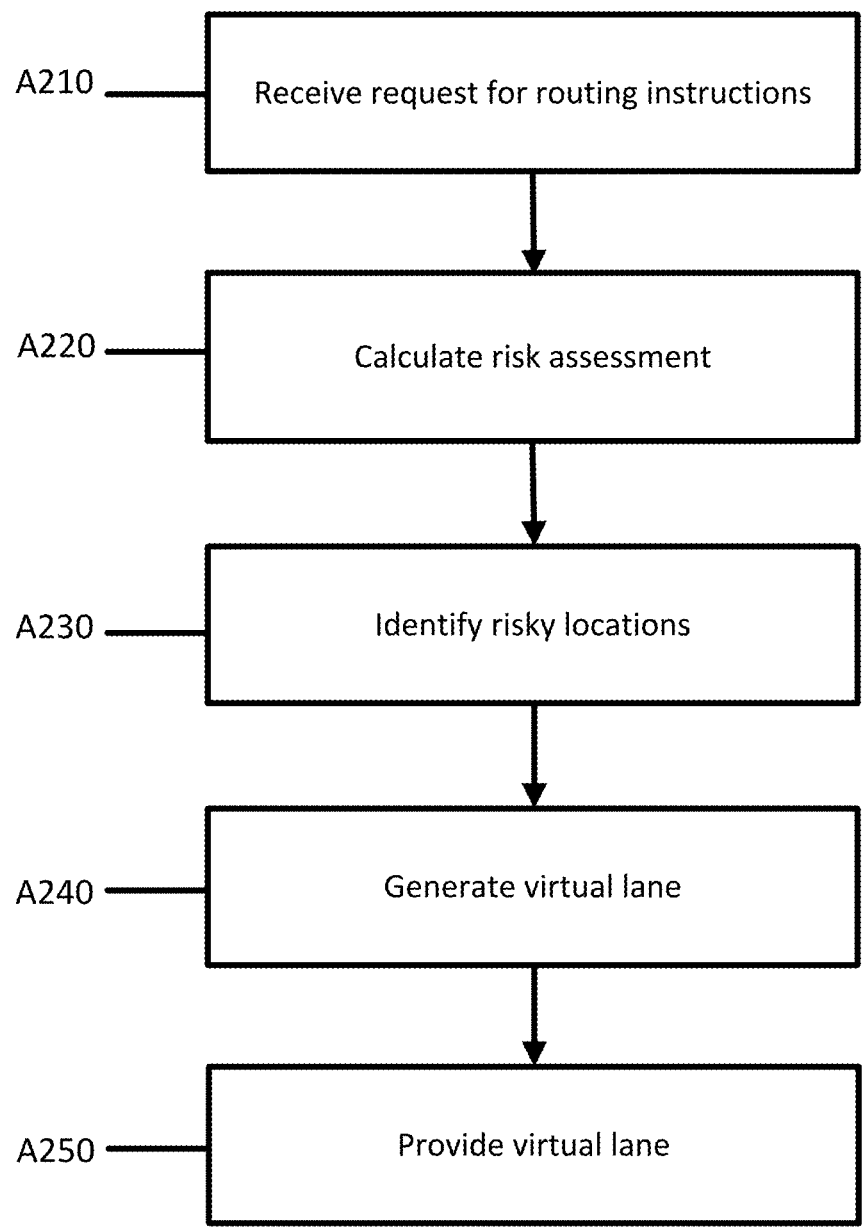
FIG. 10 depicts a flow chart for a method for generating virtual lanes according to an embodiment.

FIG. 10 illustrates an example flow chart for generating a virtual lane in order to avoid a hazardous condition. As presented in the following sections, the acts may be performed using any combination of the components indicated in FIG. 1 or FIG. 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, the mapping system 121 receives a request for routing instructions. In an embodiment, the device 122 may receive the request and bypass the mapping system 121. The routing instructions may include lane level routing instructions. In an example, an autonomous vehicle may require lane level routing in order to traverse a roadway from a starting point to a destination. If, for example, the vehicle needs to make a turn, the vehicle must be in the correct lane to make that turn and as such requires lane level instructions. Further, to optimize the use of the roadway, lane level instructions may be required. The routing instructions may be altered or changed as the vehicle traverses the roadway. For example, lane level routing instructions may depend on the immediate surroundings of the vehicle as it traverses the roadway and as such may be provided in real-time or updated constantly.

At act A220 the mapping system 121/device 122 calculates risk assessments for a plurality of portions of existing lanes of a roadway based on real time roadway data and historical geographical data stored in a geographic database 123 as a vehicle traverses the roadway. The real-time roadway data and the historical geographic data may be stored in one or more layers in the geographic database 123 or, for example, with a lane model layer. The lane model layer contains the geometry of lane boundaries and lane centerline paths. The geometry of the lane model layer may be used to assist in storing real time data relating to possible loss of traction events by providing a location framework for which to locate the data. For example, a puddle of standing water may be identified by a vehicle and stored in the geographic database 123 using the lane geometry provided by the lane model layer.

In an embodiment, the geographic database 123 includes a separate data layer for water level on the roadway. This layer may include or take into account data for the water fluctuation table (WFT), e.g. the depth of water above the roughness asperities of pavement. This data may include water level estimates based on weather or human related events (burst pipe, open hydrant, etc.). The data layer may also store data that relates to observations from vehicles or other sensors. This data may be made available to a device 122 embedded with the vehicle that can control the vehicle. The device 122 is able to generate a personal or private risk model as the navigation device 122 may store data relating to other variables such as the weight, tire type, capabilities, etc. of the vehicle. The device 122 is also configured to identify the speed of the vehicle.

The mapping system 121 may be configured to generate risk assessments for multiple different locations and for multiple different types of events. As an example, the mapping system 121 is configured to generate a risk assessment for possible hydroplaning events along the route generated at A210. For hydroplaning events, the risk assessment may take into account values for variable such as water fluctuation table (WFT) (in.), where WFT is considered to be the depth of water above roughness asperities of pavement, tread depth (in.), footprint aspect ratio, tire inflation pressure (psi), wheel load (kips), spin down ratio, among other inputs. Different equations may be used to calculate whether or not a vehicle will experience a hydroplaning event. These equations are used to calculate a predicted hydroplaning speed (mph) when input data from the geographic database 123 and sensors on the vehicle. If the vehicle is expected to exceed the calculated speed at a location, then the vehicle may be at risk of hydroplaning. The chance and a confidence level may also be calculated with the risk assessment.

The risk assessments may be custom for a vehicle. The mapping system 121 is configured to identify attributes of the vehicle and apply those attributes to the risk assessment. These vehicle specific attributes may include the type of control system (e.g. fully autonomous, semi-autonomous, manual, etc.), the type and condition of the tires, the weight of the vehicle, past performance/experience, and any other attribute that may contribute to the risk model. In an embodiment, the values for these attributes are different for different vehicles. Due to different values for the attributes (such as weight, tire type, speed, etc.) one vehicle may not have experienced a loss of traction event while another vehicle would if it continued though the hazardous location.

At act A230, the mapping system 121/device 122 identifies a risky location on a portion of an existing lane that the vehicle is expected to traverse. The mapping system 122 may determine that the risk assessment for the location exceeds an operating threshold for the vehicle. One or more of the risks assessed at act A220 may indicate that there is high (e.g. more than 50%, 75%, 90%) that the vehicle will experience a hydroplaning or loss of traction event. These risks may be dynamic, in that they may change over time, for example, the chance of a hydroplaning event may increase during periods of inclement weather, but decrease after the weather has passed.

The areas of risk may be identified with a precision that identifies a precise location of the hazardous condition on an HD map. The system may be able to identify that only one side or tire of a vehicle may be affected. The system may be able to identify that by shifting the vehicle a certain amount to the left or right, the vehicle may avoid the hydroplaning event or diminish the risk to the point where it is an acceptable risk.

At act A240, the mapping system 121/device 122 generates a virtual lane that avoids or diminishes the risky location, the virtual lane comprising only a part of the existing lane. In the geographic database 123, the lane model layer contains the geometry of lane boundaries and lane centerline paths. The lane model layer may be used by autonomous vehicles or semi-autonomous vehicles to safety navigate the roadway. The lane model and sensors help the vehicle find and stay in the correct lane and provides the driver with detailed lane-level visual guidance. The virtual lane, however, does not correspond to the lane model geometry stored in the geographic database 123. For example, whereas a roadway may include four lanes (one in each direction and two shoulders), the virtual lane may alter the geometry so that there are only three lanes (one in each direction, and only one shoulder). Different arraignments or configurations may be used. A configuration that allows traffic to flow normally in both directions may be preferred, but may not be possible in certain circumstances.

Because the virtual lane is a construct and not based on observed markers, the virtual lane must be transmitted to other vehicles on the roadway in order to make sure that each vehicle understands the current situation. Acknowledgement of the virtual lane may be required by other vehicles in the area before it is implemented. In addition, multiple vehicles may propose different configurations, only one of which may be implemented. A virtual lane may last for only a short amount of time (for example a time that it takes a vehicle to avoid a hazardous location) or for a long time (for example, a time that it takes the hazardous location to dissipate or be removed/cleaned up).

Figure 11:
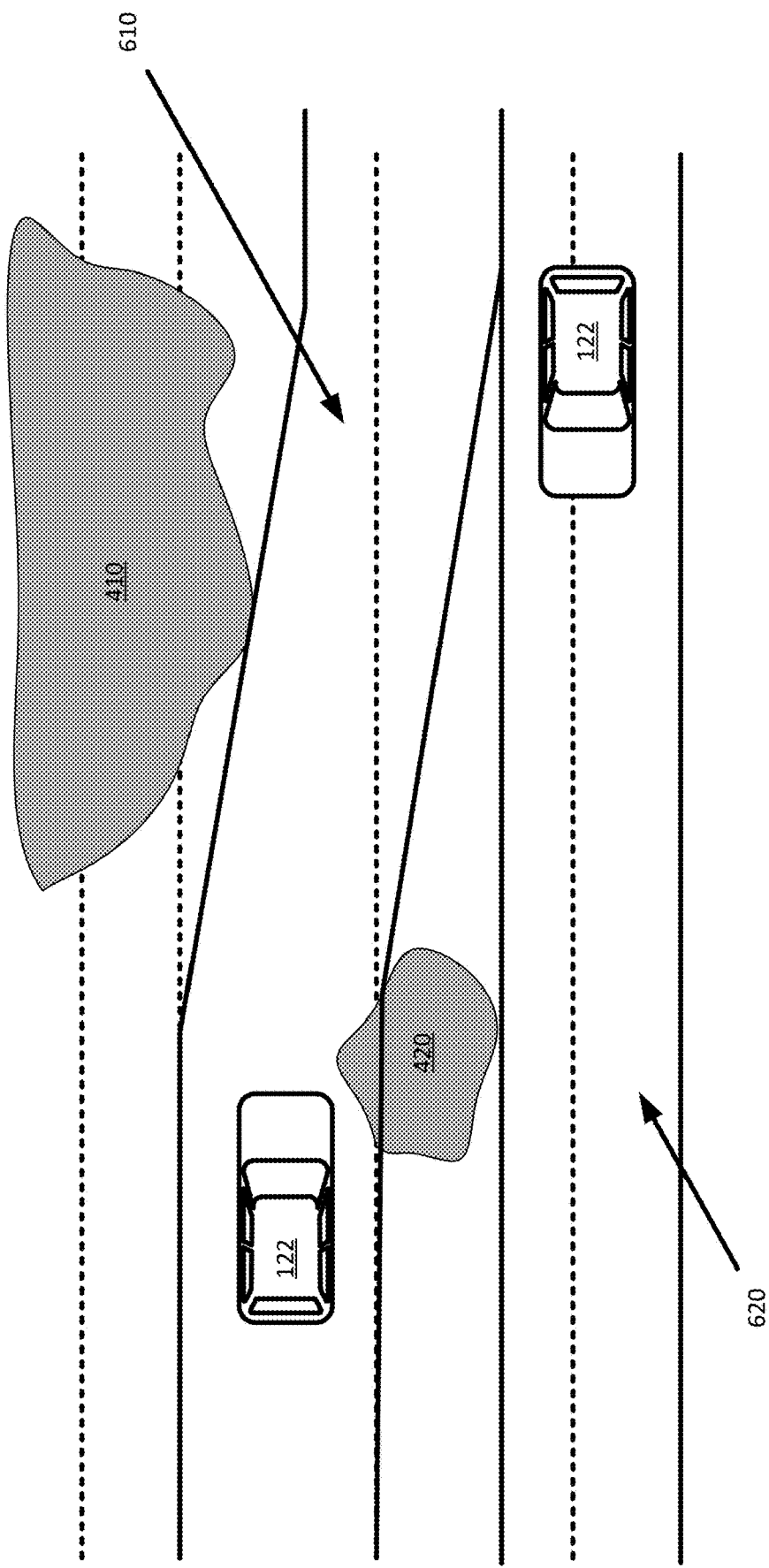
FIG. 11 depict a configuration of virtual lanes according to an embodiment.

FIG. 11 depicts virtual lanes 610, 620 that avoid the two hazardous locations 410, 420. FIG. 11 depicts a similar location as FIGS. 7 and 9. The old lanes are depicted with dotted lines. The new virtual lanes no longer follow the road lines, but rather are constructs created by the mapping system 121 or devices 122. The devices 122 or mapping system 121 may coordinate with vehicles in the area so that each hazard is avoided and each device 122 identifies and acknowledges the new virtual lane structure.

At act A250, the mapping system 121 provides the new virtual lane and routing instructions to the device 122 and any other vehicle in the vicinity of the device 122. In a normal situation, the vehicle identifies each location and the configuration of the roadway. The device 122 uses a localization model. That model uses lane-markers, signs, and roadside objects to understand its position on the road within a measure of centimeters. With the virtual lane, the device 122 still understands its position using the localization model, but it operates with the new virtual lane configuration which may include new virtual markers, virtual signs, virtual curbs, etc.

Figure 12:
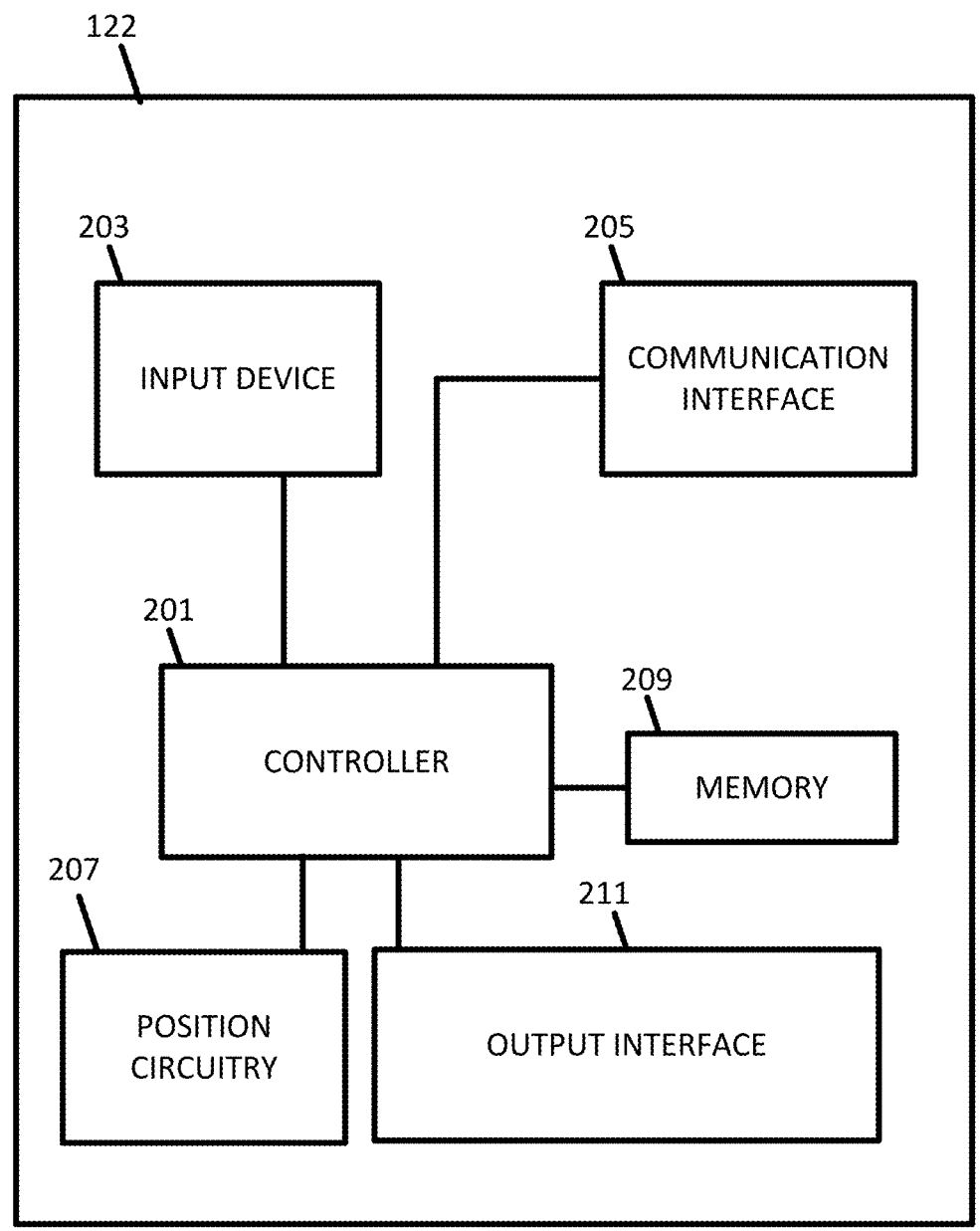
FIG. 12 depicts an example device of FIG. 1.

FIG. 12 illustrates an example device 122 of the system of FIG. 1 that may be configured to provide lane level instructions to a vehicle to avoid loss of traction events. The device 122 may be configured to collect, transmit, receive, process, or display data. The device 122 may also be referred to as a probe 122, a mobile device 122, a data source 122, or a navigation device 122. The device 122 includes a controller 201, a memory 209, an input device 203, a communication interface 205, position circuitry 207, and an output interface 211. Additional, different, or fewer components are possible for the device 122. The device 122 may be smart phone, a mobile phone, a personal digital assistant (PDA), a tablet computer, a notebook computer, a stationary computer, a IoT device, a remote sensor, a personal navigation device (PND), a portable navigation device, and/or any other known or later developed device that is configured to collect, transmit, receive, process, or display data. In an embodiment, a vehicle may be considered a device 122, or the device 122 may be integrated into a vehicle. The device 122 may receive or collect data from one or more sensors in or on the vehicle.

The device 122 may be configured to provide a predictive system that can determine with a given confidence level the risk of an area being subject to hydroplaning based on input data. The device 122 may be configured to map such hydroplaning disturbances on the map with their likelihood and related confidence level (at current time and at the time the device 122 will reach this area). The device 122 may be configured to provide lane level predictions and may be configured to link risky areas to disengagement areas for autonomous vehicles when applicable. The device 122 may be configured to take preemptive measures based on the knowledge of the models to avoid reaching the state of hydroplaning risk.

The device 122 may receive data such as a route that is generated by a mapping system 121. The device 122 may receive data that allows the device 122 to be able to generate a route. The device 122 may store the route or instructions in a memory 209. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123, link node routing graph, and/or HD map. The locally stored geographic database 123 may be a copy of the geographic database 123 or may include a smaller piece. The locally stored geographic database 123 may use the same formatting and scheme as the geographic database 123.

The controller 201 may include a general processor, digital signal processor, an application specific integrated circuit (ASIC), field programmable gate array (FPGA), analog circuit, digital circuit, combinations thereof, or other now known or later developed processor. The controller 201 may be a single device or combinations of devices, such as associated with a network, distributed processing, or cloud computing. The controller 201 may receive updated instructions, traffic data, or other data. The controller 201 is configured to identify an upcoming location on a portion of a lane that will result in a hydroplaning event for the vehicle, the controller 201 further configured to generate a virtual lane that is different than stored lane data in the geographic database, the virtual lane avoiding the upcoming location.

The controller 201 may be configured to calculate a risk assessment for different locations when input data from the geographic database 123 and vehicle sensors. The controller 201 may be configured to generate lane level routing instructions that avoid a location if a risk for the vehicle exceeds a threshold level. The threshold level may be based on the operating capabilities of the vehicle. The controller 201 may be configured to generate alternative routes, alternative vehicle instructions, virtual lanes, among other remedies in order to avoid a hazardous location/condition or diminish the risk. The controller 201 may be configured to communicate with the mapping system 121, other vehicles, or sensors on the roadway using the communications interface 205.

The communication may be performed using a communications interface 205. The communications interface 205 may include any operable connection. An operable connection may be one in which signals, physical communications, and/or logical communications may be sent and/or received. An operable connection may include a physical interface, an electrical interface, and/or a data interface. The communications interface 205 provides for wireless and/or wired communications in any now known or later developed format. The communications interface 205 may include a receiver/transmitter for digital radio signals or broadcast mediums. The communications interface 205 may include information related to hydroplaning data such as data relating to a detailed and precise mapping layer for water depth, routing, or other navigation service. The communication interface 205 is configured to transmit the virtual lane to devices in the vicinity of the vehicle that are traversing the roadway network. The information may be displayed to a user or occupant of the vehicle using an output interface 211. The output interface 211 may be a liquid crystal display (LCD) panel, light emitting diode (LED) screen, thin film transistor screen, or another type of display. The output interface 211 may also include audio capabilities, or speakers.

The communications may include information such as route guidance or traffic conditions. The communications may include an instruction for an action to be taken by the vehicle. In an embodiment, the controller 201 performs the instructions automatically. The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the road segment and node information provided to the navigation device 122. An autonomous vehicle or HAD may be configured to receive instructions from a mapping system 121 or the controller 201 and automatically perform an action.

The device 122 may be integrated in the vehicle, which may include assisted driving vehicles such as autonomous vehicles, highly assisted driving (HAD), and advanced driving assistance systems (ADAS). Any of these assisted driving systems may be incorporated into device 122. Alternatively, an assisted driving device may be included in the vehicle. The assisted driving device may include memory, a processor, and systems to communicate with the device 122. The assisted driving vehicles may response to geographic data received from geographic database 123 and the server 125, which may have been updated.

The controller and the output interface 211 may be configured to render and present a user interface to a user that provides instructions or explanations on how or why the vehicle is being operated in a certain way.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for lane level risk assessments, the method comprising:
   receiving, by a processor, real-time roadway data for a portion of a lane of a roadway;
   generating, by the processor, based on the real-time roadway data and historical geographical data stored in a geographic database, a risk assessment for the portion of the lane of the roadway;
   receiving, by the processor, a request for routing instructions, from a vehicle;
   applying the risk assessment to the vehicle for the portion of the lane of the roadway;
   generating, by the processor, a virtual lane that avoids the portion of the lane of the roadway;
   transmitting, by the processor, the virtual lane to one or more other vehicles on the roadway in an area of the portion of the lane;
   receiving, by the processor, acknowledgement of the virtual lane from the one or more other vehicles;
   generating, by the processor, lane level routing instructions including traversing the virtual lane for the vehicle based on the applied risk for the vehicle; and
   transmitting, by the processor, the lane level routing instructions to the vehicle.

2. The method of claim 1, wherein the risk assessment is configured to model a risk of a hydroplaning event.

3. The method of claim 2, wherein a second vehicle that initially provided the real-time roadway data did not experience a hydroplaning event.

4. The method of claim 3, wherein applying the risk assessment to the vehicle comprises at least inputting values for one or more attributes for the vehicle that are different than the second vehicle.

5. The method of claim 4, wherein the one or more attributes comprise at least one of a weight of the vehicle, an expected speed of the vehicle, or a tire type of the vehicle.

6. The method of claim 2, wherein the real-time roadway data comprises data for a depth of water on the portion of the lane of the roadway.

7. The method of claim 1, wherein the portion of the lane comprises less than 50% of the lane.

8. The method of claim 1, further comprising:
   monitoring, by the processor, the portion of the lane of the roadway as the vehicle travels past the portion of the lane of the roadway.

9. An apparatus comprising:
   at least one processor; and
   at least one memory including computer program code for one or more programs; the at least one memory configured to store the computer program code configured to, with the at least one processor, cause the at least one processor to:

receive a request for routing instructions for a vehicle;
calculate a risk assessment for a portion of an existing lane of a roadway based on real-time roadway data and historical geographical data stored in a geographic database;
determine, the risk assessment exceeds an operating threshold for the vehicle;
generate a virtual lane that avoids the portion of the existing lane, the virtual lane comprising only a part of the existing lane;
transmit the virtual lane to one or more other vehicles expected to traverse the portion of the existing lane;
receive an acknowledgement of the virtual lane from the one or more vehicles; and
provide the virtual lane to the vehicle.

10. The apparatus of claim 9, wherein the at least one processor is integrated with the vehicle.

11. The apparatus of claim 9, wherein the real-time roadway data comprises data acquired by a sensor embedded in the vehicle.

12. The apparatus of claim 9, wherein the risk assessments are calculated for a risk of the vehicle experiencing a hydroplaning event.

13. The apparatus of claim 12, wherein the real-time roadway data comprises at least data for a depth of water.

14. The apparatus of claim 12, wherein the portion of an existing lane comprises less than 50% of an existing lane.

15. The apparatus of claim 9, wherein the virtual lane is only generated and used for a time that it takes the vehicle to avoid the risk.

16. The apparatus of claim 9, wherein the virtual lane comprises lane geometry that is fully outside of a respective normal lane geometry.

17. The apparatus of claim 9, wherein a geometry of the virtual lane is transmitted to the one or more other vehicles expected to traverse the portion of the existing lane.

18. A system for avoiding loss of traction events, the system comprising:
a memory configured to store lane data for a roadway network;
a processor integrated into a vehicle, the processor configured to identify an upcoming location on a portion of a lane that will result in a loss of traction event for the vehicle, the processor further configured to generate or receive a virtual lane that is different than stored lane data in a geographic database, the virtual lane avoiding the upcoming location; and
a transceiver configured to transmit or receive the virtual lane to or from devices in a vicinity of the vehicle that are traversing the roadway network, the transceiver further configured to receive an acknowledgment of the virtual lane from the devices in the vicinity of the vehicle.

19. The system of claim 18, wherein the processor is configured to identify the upcoming location based on real-time roadway data acquired from sensors embedded in a different vehicle.

* * * * *